(12) United States Patent
Zandbergs

(10) Patent No.: US 12,634,415 B2
(45) Date of Patent: May 19, 2026

(54) MOBILE DEVICE FOR GENERATING AND MOVING A LASER BEAM IN A PREDETERMINED MANNER

(71) Applicant: EYE ROLL, SIA, Kandava (LV)

(72) Inventor: Janis Zandbergs, Kandava (LV)

( * ) Notice: Subject to any disclaimer, the term of this patent is extended or adjusted under 35 U.S.C. 154(b) by 373 days.

(21) Appl. No.: 18/253,782

(22) PCT Filed: Nov. 22, 2021

(86) PCT No.: PCT/LV2021/050012
§ 371 (c)(1),
(2) Date: May 21, 2023

(87) PCT Pub. No.: WO2022/114945
PCT Pub. Date: Jun. 2, 2022

(65) Prior Publication Data
US 2024/0009066 A1 Jan. 11, 2024

(30) Foreign Application Priority Data
Nov. 24, 2020 (LV) ................................ P2020000081

(51) Int. Cl.
*H04N 9/31* (2006.01)
*G03B 21/14* (2006.01)
*G03B 21/20* (2006.01)
*A61H 5/00* (2006.01)

(52) U.S. Cl.
CPC .............. *H04N 9/3129* (2013.01); *A61H 5/00* (2013.01); *G03B 21/142* (2013.01); *G03B 21/2033* (2013.01); *G03B 21/2046* (2013.01); *G03B 21/2066* (2013.01)

(58) Field of Classification Search
CPC ................ H04N 9/3129; G03B 21/142; G03B 21/2033; G03B 21/2046; G03B 21/2066
See application file for complete search history.

(56) References Cited

U.S. PATENT DOCUMENTS

| | | | | |
|---|---|---|---|---|
| 2004/0239894 A1* | 12/2004 | Shimada | .............. | G02B 26/101 348/E9.026 |
| 2005/0152012 A1* | 7/2005 | Nambudiri | ........... | H04N 9/3129 348/E9.026 |
| 2006/0255243 A1* | 11/2006 | Kobayashi | ........... | G02B 27/104 250/208.1 |
| 2020/0374498 A1* | 11/2020 | Sodhi | ................... | H04N 9/3176 |
| 2021/0136334 A1* | 5/2021 | Wang | ................... | H04N 9/3164 |

* cited by examiner

*Primary Examiner* — Bao-Luan Q Le
(74) *Attorney, Agent, or Firm* — Patshegen IP; Moshe Pinchas

(57) ABSTRACT

The invention relates to the field of eye health, especially to devices and methods for extraocular muscle training.
Extraocular muscle training device (1) comprises a laser device (2) configured to generate a laser beam (3), a manipulator (4) connected to the laser device (2) and configured to move the laser device (2) so that the laser point (33) of the laser beam (3) generated by the laser device (2) can be moved around onto the surface (9) in a predetermined pattern (10). During its use, the device (1) is positioned in proximity of the user (11); the laser beam (3) is generated onto a surface (9; 19) within the range of the vision field of the user (11); and the laser point (33) of the laser beam (3) is positioned in a predetermined pattern (10) so that the eyes of the user (11) may track the laser point (33).

7 Claims, 6 Drawing Sheets

MOBILE DEVICE FOR GENERATING AND MOVING A LASER BEAM IN A PREDETERMINED MANNER

FIELD OF THE INVENTION

The invention relates to devices for generating and moving a laser beam in a predetermined manner where such devices are usable in the field of eye relaxation and strengthening trainings.

BACKGROUND OF THE INVENTION

The U.S. Pat. No. 10,722,422 discloses a visual acuity training device comprising a guiding unit, an eye-movement sensor, and a controller. The guiding unit is configured to guide an eyeball to move towards multiple predetermined positions. The eye-movement sensor is configured to obtain multiple eye-movement signals according to movement of the eyeball. The controller obtains multiple eyeball muscle parameters according to the eye-movement signals, and the controller controls the guiding unit according to the eyeball muscle parameters, so as to adjust the predetermined positions. The system uses 3D imaging and virtual reality that (as any other similar artificial or unnatural environments) can cause vergence-accommodation conflict (the visual system cannot coordinate equally accommodation and vergence response at various simulated viewing distances), which in turn causes additional visual fatigue. Consequently, they are distant from the real environment, where a person has to orient themselves and where all eye muscle systems work in harmony.

The United States patent application publication No. US2005/0213034 discloses an eye training equipment comprising irritation generating devices disposed around an eyeball. The disposed irritation generating devices are operated one by one to allow the line of sight of a user to follow up in the direction of the irritating position. This equipment and method of use does not directly affect visual stimulation. It is not possible for the user to improve the coordinated functioning of the eye muscles, to act equally effectively on both the eye movement apparatus and the accommodation system.

The United States patent publication No U.S. Pat. No. 6,113,458 discloses a device for laser generation and moving of a laser beam generated thereof. The device comprises a laser, multiple mirrors, motors, a beam scattering medium and other elements. Various and multiple parts of the device make it very complex and relatively big.

Another system for relieving eye strain is described in the United States patent application publication No. US2005/0007550. The system requires a use of a computer display and monitor which basically is not the best way as excessive computer use is not advisable. Moreover, the system cannot be mobile as implemented monitors or displays are stand alone units.

The aim of the invention is to develop a mobile device and method for generating and moving a laser beam in a predetermined manner intended for the preventive exercising and strengthening of the eye muscles (extraocular muscles directly and intraocular muscle indirectly) in order to maintain a favourable tone of the motor function of the eye.

SUMMARY OF THE INVENTION

The aim is reached by design of a mobile device comprising a laser device configured to generate a laser beam and project it onto a surface. The device further comprises a manipulator connected to the laser device and configured to move at least the laser device so that the laser point of the laser beam generated by the laser device can be moved around onto the surface in a predetermined pattern. The surface may be a ceiling, wall or white screen. The device further comprises a control unit configured to provide instructions for the manipulator to move around or continuously reposition the laser device and subsequently the laser point of the laser beam onto the surface in the predetermined pattern or manner.

The invention stimulates the intense activity of the extraocular (and partially also intraocular) muscles of the eye by restoring the coordination and adaptability of the eye. The device controls the projected image and its movement in a certain area according to a pre-prepared program, forcing the user to follow these movements with the eyes, promoting eye movement in the least used sectors of the visual field. Additionally, the efficiency of the device is ensured by the option to change the movement direction, amplitude, and velocity, as well as to change the size and form of the fixation target, which is the laser point of the laser beam.

The manipulator is in the form of two manipulation motors. One motor is a laser motor connected to the laser device to provide rotational movement of the laser device. Another motor is a mirror motor connected to a mirror. The mirror itself is rotationally connected to the extraocular muscle training device and positioned so that the laser beam can be projected onto the mirror. The mirror motor is connected to the mirror so that a rotational movement of the mirror is provided. The synchronized movement or rotation of the laser device and mirror coordinated by the control unit ensures projection of the laser point of the laser beam in the predetermined pattern or manner.

When the device is in use, the device is positioned within a hand reach of a user so that the projected laser point of the laser beam is within the vision field of the user and the user may keep his/her head still.

The manipulator is configured to incline the laser beam preferably up to 30 degrees from the vertical central axis of the extraocular muscle training device. The vertical central axis of the extraocular muscle training device is orthogonal to the plane or surface onto which the extraocular muscle training device is positioned during its use.

In other embodiments the device may further comprises a laser point forming device configured to form the laser point of the laser beam in the form of a star, cross, triangle, rectangular or polygon. The laser point forming device may be a mask that masks the laser beam.

In more detail, the mobile device comprises the laser device configured to generate the laser beam and project it onto the surface, the manipulator and the control unit configured to provide instructions for the manipulator to move around the laser device and subsequently the laser point of the laser beam of the laser device onto the surface in the predetermined pattern. The manipulator is connected to the laser device and configured to move at least the laser device so that the laser point of the laser beam generated by the laser device can be moved around onto the surface in the predetermined pattern. The manipulator comprises a housing that holds the laser motor. The laser motor comprises a drive axle onto which is fixed the laser device. The laser motor is configured to rotate the drive axle and subsequently the laser device around the longitudinal axis of the laser motor. The laser device is fixed onto the drive axle so that the longitudinal axis of the laser device is orthogonal to the longitudinal axis of the laser motor and respective drive axle. The manipulator further comprises the mirror and the mirror motor. The mirror is rotationally attached to the brackets of the housing so that the mirror can rotate around its longitudinal axis. The mirror motor is attached to the housing and operationally connected to the mirror by means of a gear transmission so that a rotational movement of the mirror can be provided by the rotation of the mirror motor. The longitudinal axis of the laser motor, the longitudinal axis of the mirror and the longitudinal axis of the laser are orthogonal to each other. Such arrangement allows to design compact and subsequently mobile device having easy control of the laser beam. The rotation of the laser device and mirror coordinated by the control unit ensures projection of the laser point of the laser beam in the predetermined pattern.

The present invention is also a method for control of the laser beam of aforementioned device. The method comprises the following steps: positioning the device within the hand reach of the user of the device; generating the laser beam on the surface within the range of the vision field of the eyes of the user; and positioning the laser point of the laser beam in a predetermined pattern so that the eyes of the user is able to track the laser point of the laser beam onto the surface. The surface may be a ceiling, a wall or a screen.

The application of the device for example may be used in living or office rooms, where the focused light beam is projected on the ceiling surface of the room. The user places the beam generator on a stable surface and takes a stable, released position lying on his back or in a sitting position with his head firmly supported. The control unit of the device activates the movement of the projected light beam along a predetermined trajectory. The user's task is to follow the projected point of light or laser with the eyes, which thus preferably stimulates and directs the extraocular muscle training process.

BRIEF DESCRIPTION OF THE DRAWINGS

The drawings illustrate generally, by way of example, but not by way of limitation, various embodiments of the invention.

DETAILED DESCRIPTION OF THE EMBODIMENTS

Figure 1:
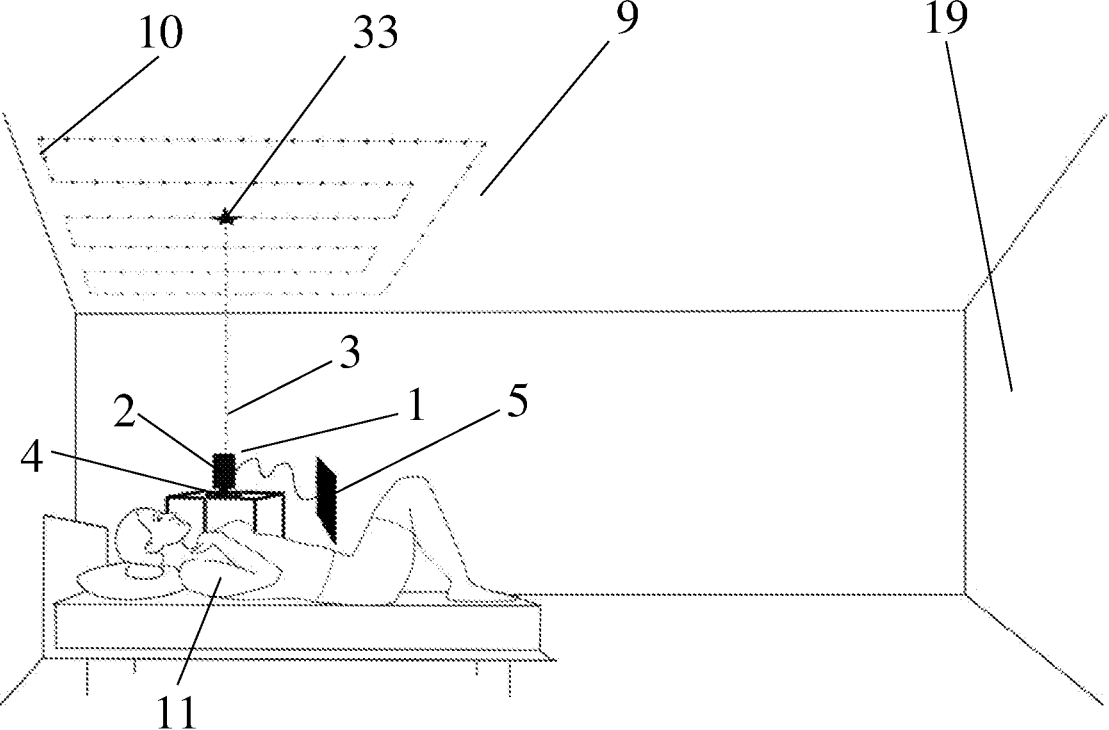
FIG. 1 is a graphical representation of a use of an extraocular muscle training device (1) by a user (11). The user (11) is in a lying position.
Figure 2:
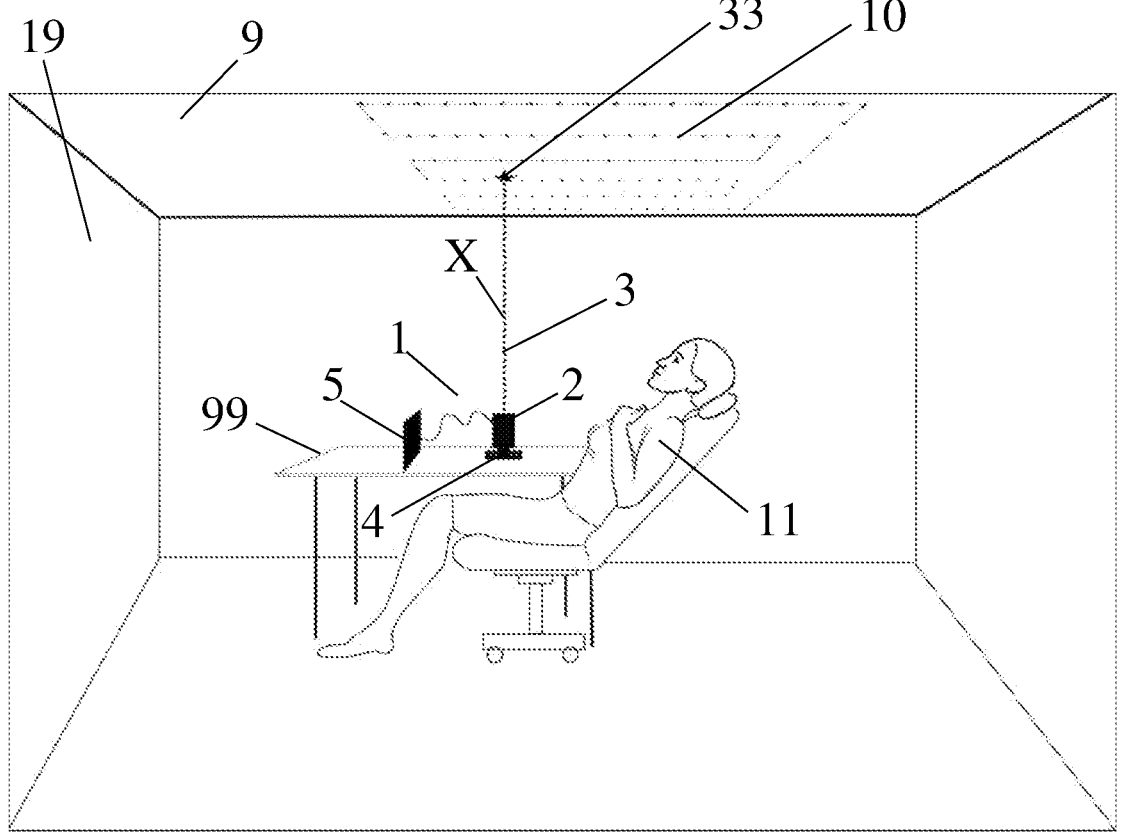
FIG. 2 is a graphical representation of a use of an extraocular muscle training device (1) by a user (11). The user (11) is in a sitting position.

FIGS. 1 and 2 illustrate a use of the extraocular muscle training device (1) by a user (11). In FIG. 1, the user (11) is in a lying position, but in FIG. 2, the user (11) is in a sitting position. The extraocular muscle training device (1) is positioned on the horizontal surface (99) of the table. The device (1) comprises a laser device (2) configured to generate a laser beam (3) and project the laser point (33) of the laser beam (3) onto a surface (9) which is a ceiling. The device (1) further comprises a manipulator (4) connected to the laser device (2) and configured to move at least the laser device (2) so that the laser point (33) of the laser beam (3) generated by the laser device (2) can be moved around onto the surface (9) in a predetermined pattern (10). The device (1) further comprises a control unit (5) configured to provide instructions for the manipulator (4) to move around the laser device (2) and subsequently the laser point (33) of the laser beam (3) onto the surface (9) in the predetermined pattern (10). The device (1) is positioned in a proximity of the user (11) so that the laser point (33) of the laser beam (3) may be tracked by the eyes of the user (11) without the head movement.

Figure 3:
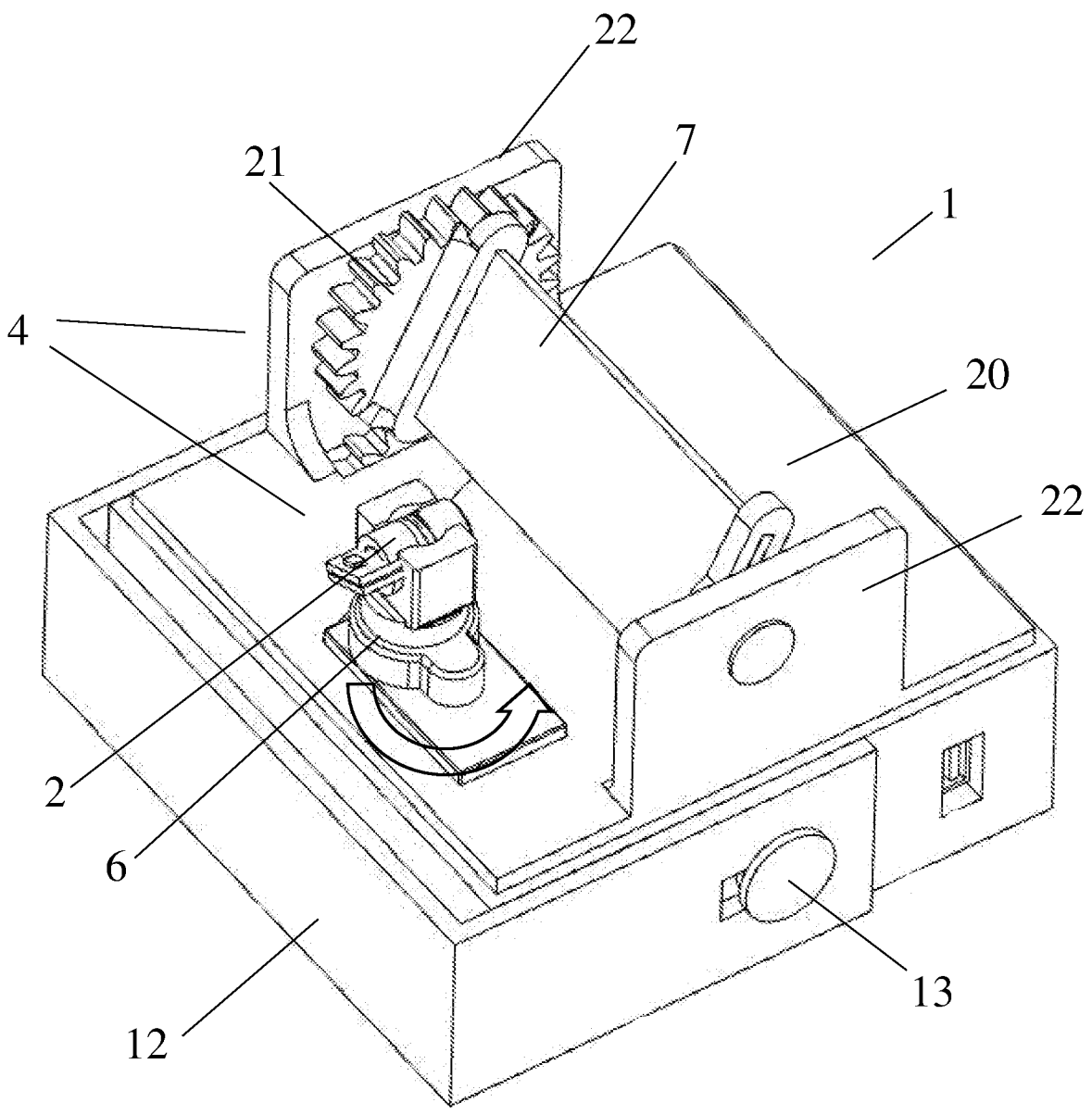
FIG. 3 illustrates one embodiment of an extraocular muscle training device (1).
Figure 4:
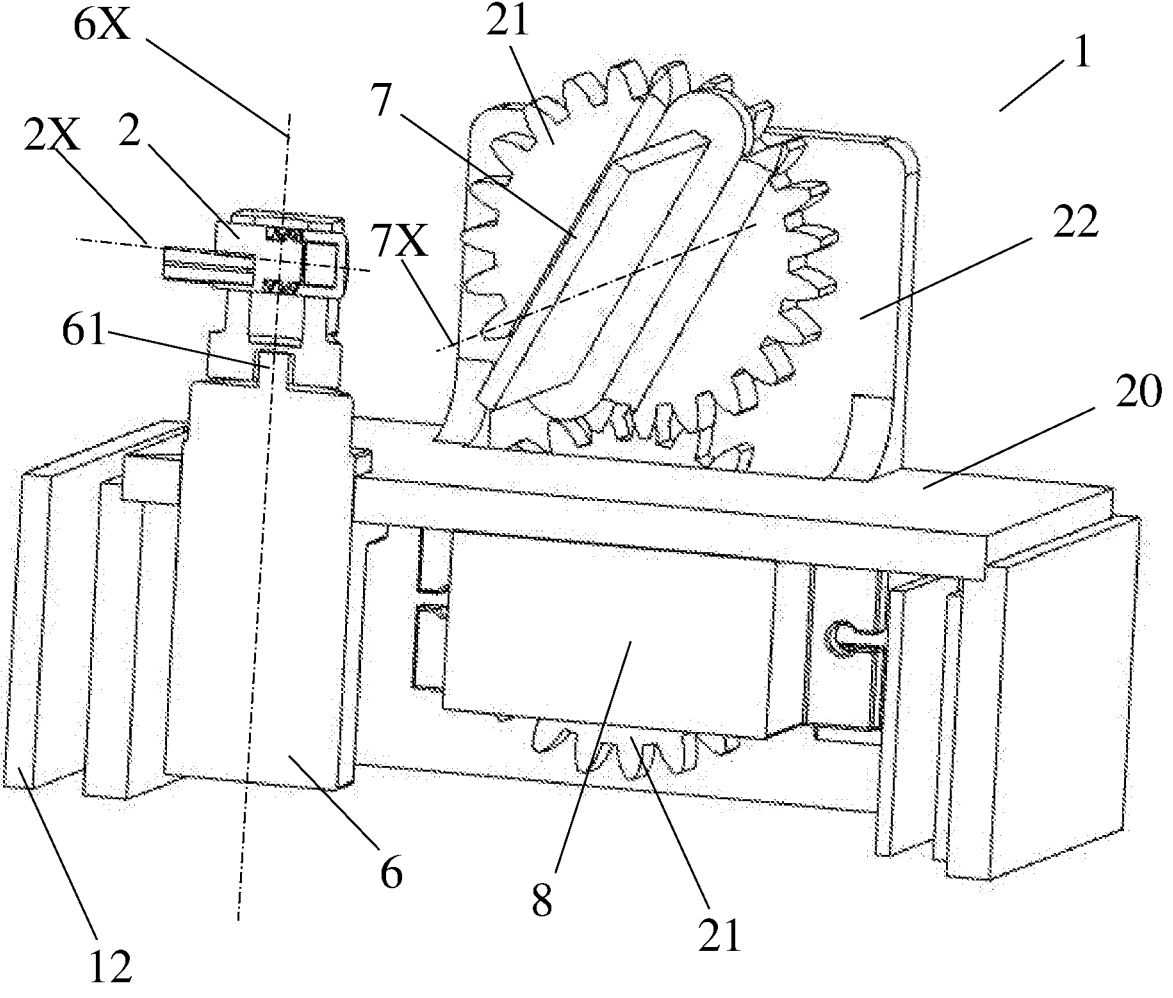
FIG. 4 illustrates a cross-section of the extraocular muscle training device (1) as seen in FIG. 3.
Figure 5:
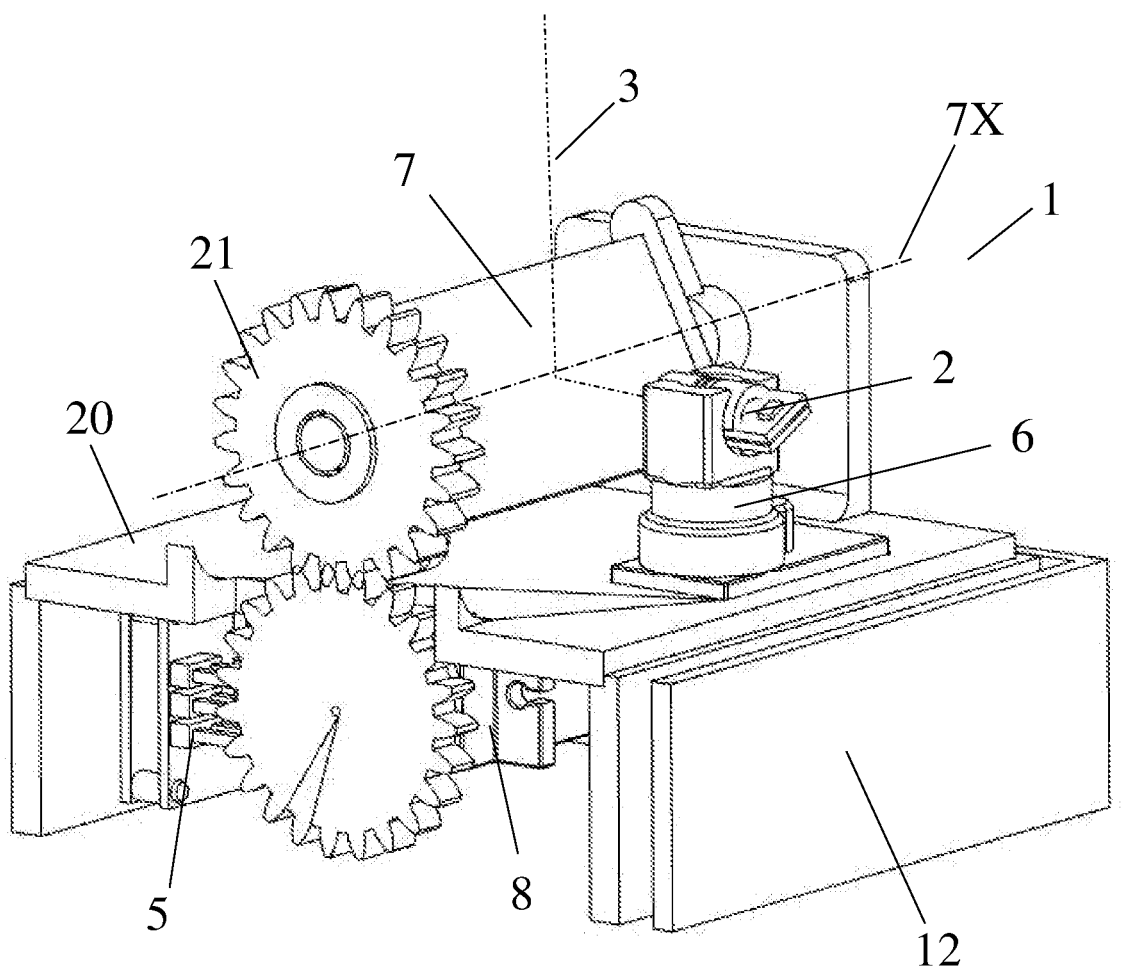
FIG. 5 illustrates a cross-section of the extraocular muscle training device (1) as seen in FIG. 3.

FIGS. 3, 4 and 5 illustrate one embodiment of an extraocular muscle training device (1). The extraocular muscle training device (1) comprises a housing (20). The housing (20) is in a cube shape and further comprises two brackets (22) extending upward from the housing (20) for holding additional parts of the device (1). The manipulator (4) is in the form of only two motors (6; 8). The laser motor (6) is fixed to the housing (20). The laser motor (6) comprises a drive axle (61). The laser device (2) is fixed to the drive axle (61) so that the longitudinal axis (2X) of the laser device (2) is orthogonal to the longitudinal axis (6X) of the laser motor (6). The laser motor (6) is configured to provide a rotational movement of the laser device (2) in one plane. The mirror motor (8) is fixed to the housing (20) and connected to the mirror (7) via gear transmission (21). In other embodiments it may be belt transmission or any other well-known transmission. The mirror (7) is hingedly connected between two brackets (22) of the housing (20) so that the mirror motor (8) via the gear transmission (21) can rotate the mirror (7) around its axis (7X). The control unit (5) is electronically connected to the mirror motor (8) and to the laser motor (6) and configured to provide signals to the motors (6, 8) so that the motors (6, 8) can rotate laser device (2) and mirror (7) in a predetermined manner. In result of this rotation of laser device (2) and mirror (7) the laser beam (3) generated by the laser device (2) may be projected or positioned in a predetermined pattern. The longitudinal axis (6X) of the laser motor (6), the longitudinal axis (7X) of the mirror (7) and the longitudinal axis (2X) of the laser (2) are orthogonal to each other. During normal use of the device (1), when it is placed on the horizontal surface (99) of the table or any other furniture, the longitudinal axis (6X) of the laser motor (6) is vertical to the surface (99) and the longitudinal axis (7X) of the mirror (7) and the longitudinal axis (2X) of the laser (2) are parallel to the surface (99). In addition, the device (1) further comprises a support leg (12) hingedly connected to the device (1) via a hinge (13). The support leg (12) allows to position the device (1) under various angles, which in turn allows to project the laser beam (3) onto a wall or a screen.

Figure 6:
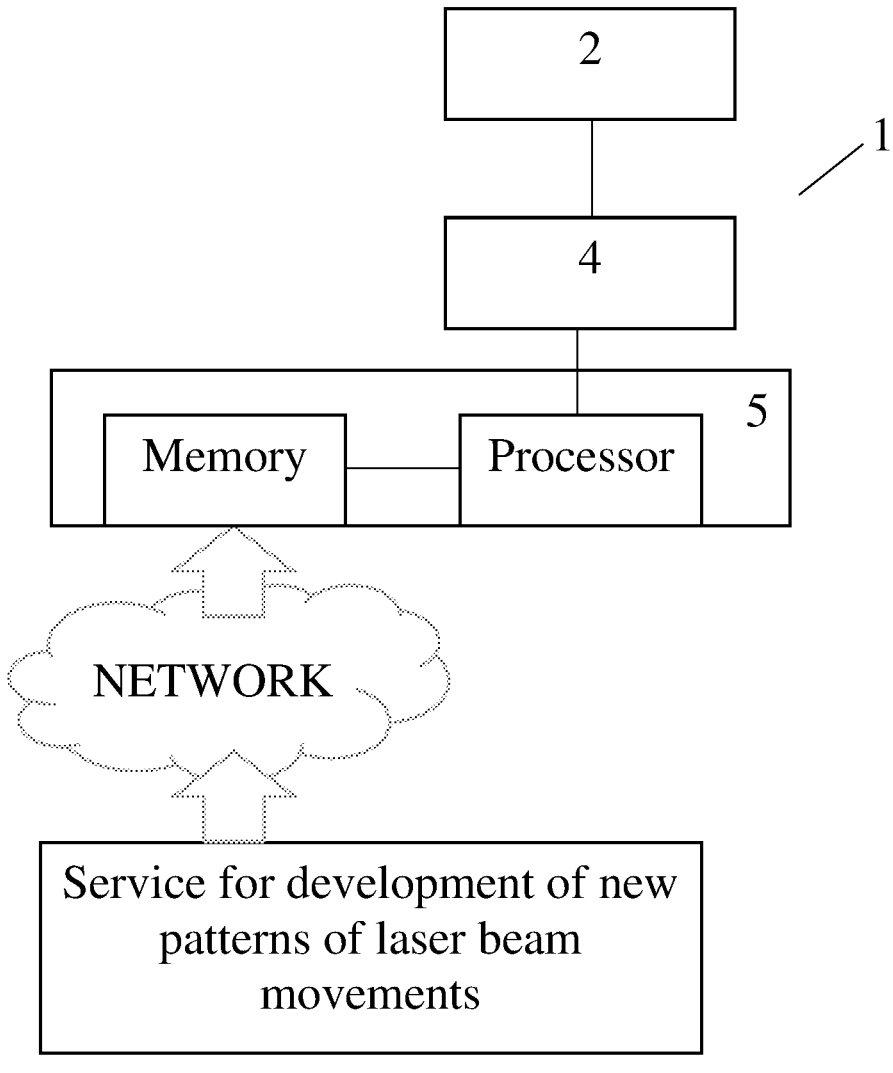
FIG. 6 illustrates a block diagram of an extraocular muscle training device (1) connected to the internet in order to provide a control code for an extraocular muscle training device (1).

FIG. 6 illustrates a block schematic, wherein the control unit (5), containing a processor and a memory, is connected to the manipulator (4) to control the movement of a laser device (2) and subsequently a laser beam. In the following embodiment as illustrated in FIG. 6, the mobile device (1) is connected to a network in order to receive instructions on new pattern of laser beam movement. Therefore, a service can be provided which send updated or tailored patterns to the device (1).

While the invention may be susceptible to various modifications and alternative forms, specific embodiments of which have been shown by way of example in the figures and have been described in detail herein, it should be understood that the invention is not intended to be limited to the particular forms disclosed. Rather, the invention includes all modifications, equivalents, and alternatives falling within the scope of the invention as defined by the following claims.

The invention claimed is:

1. A mobile device (1) for generating and moving a laser beam in a predetermined manner, characterized in that the device (1) comprises:

a laser device (2) configured to generate a laser beam (3) and project it onto a surface (9; 19);

a manipulator (4) connected to the laser device (2) and configured to move at least the laser device (2) so that a laser point (33) of the laser beam (3) generated by the laser device (2) can be moved around onto the surface (9) in a predetermined pattern (10); and a control unit (5) configured to provide instructions for the manipulator (4) to move around the laser device (2) and subsequently the laser point (33) of the laser beam (3) onto the surface (9) in the predetermined pattern (10), characterized in that the manipulator (4) comprises:

a housing (20);

a laser motor (6) attached to the housing, wherein the laser motor (6) comprises a drive axle (61) onto which is fixed the laser device (2) and wherein the laser motor (6) is configured to rotate the drive axle (61) and subsequently the laser device (2) around the longitudinal axis (6X) of the laser motor (6), and wherein the laser device (2) is fixed onto the drive axle (61) so that the longitudinal axis (2X) of the laser device (2) is orthogonal to the longitudinal axis (6X) of the laser motor (6) and respectively drive axle (61);

a mirror (7) rotationally attached to brackets (22) of the housing (20) so that the mirror (7) can rotate around its longitudinal axis (7X);

a mirror motor (8) attached to the housing (20) and operationally connected to the mirror (7) by means of a gear transmission (21) so that a rotational movement of the mirror (7) can be provided by the rotation of the mirror motor (8);

wherein the longitudinal axis (6X) of the laser motor (6), the longitudinal axis (7X) of the mirror (7) and the longitudinal axis (2X) of the laser (2) are orthogonal to each other, and wherein a rotation of the laser device (2) and mirror (7) coordinated by the control unit (5) ensures projection of the laser point (33) of the laser beam (3) in the predetermined pattern (10).

2. The device (1) according to claim 1, characterized in that, when in use, the mobile device (1) is positioned within a hand reach of a user (11) so that the projected laser point (33) of the laser beam (3) is within the vision field of the user (11).

3. The device (1) according to claim 1 characterized in that the control unit (5) is configured to provide instructions to the laser motor (6) and the mirror motor (8) so that both motors (6; 8) rotate the laser (2) and the mirror (7) respectively so that the laser beam (3) is inclined up to 60 degrees from a vertical central axis (X) of the mobile device (1), wherein the vertical central axis (X) of the mobile device (1) is orthogonal to a plane or a surface onto which the mobile device (1) is positioned when in use.

4. The device (1) according to claim 1, characterized in that the device (1) further comprises a laser point forming device (22) configured to form the laser point (33) of the laser beam (3) in the form of a star, cross, triangle, rectangular or polygon.

5. The device (1) according to claim 1, characterized in that the device (1) further comprises a support leg (12) hingedly connected to the device (1) via a hinge (13).

6. A method for control of the laser beam (3) of the device (1) according to claim 1, wherein the method comprises the following steps:

positioning the device (1) within the hand reach of the user (11) of the device (1);

generating the laser beam (3) on the surface (9; 19) within the range of the vision field of the eyes of the user (11); and positioning the laser point (33) of the laser beam (3) in a predetermined pattern (10) so that the eyes of the user (11) are able to track the laser point (33) of the laser beam (3) onto the surface (9).

7. The method according to claim 6, characterized in that the surface is a ceiling (9), a wall (19) or a screen.

* * * * *